United States Patent [19]

Rea

[11] 4,135,845
[45] Jan. 23, 1979

[54] CUTTING TOOL

[76] Inventor: Andrew Rea, 10271 Nottingham, Detroit, Mich. 48224

[21] Appl. No.: 900,253

[22] Filed: Apr. 26, 1978

[51] Int. Cl.² .............................................. B26D 1/12
[52] U.S. Cl. .......................................... 407/3; 407/97
[58] Field of Search ...................... 407/3, 4, 5, 6, 97, 407/2

[56] References Cited

U.S. PATENT DOCUMENTS

| 2,096,137 | 10/1937 | Shaw | 407/4 |
| 2,649,818 | 8/1953 | Kaiser | 407/5 |
| 3,028,657 | 4/1962 | Almen | 407/6 |
| 3,123,896 | 3/1964 | Wilson, Jr. | 407/6 |
| 3,172,190 | 3/1965 | Beach | 407/4 |
| 3,329,047 | 7/1967 | McTamany et al. | 407/6 |

FOREIGN PATENT DOCUMENTS

| 314928 | 9/1919 | Fed. Rep. of Germany | 29/96 |
| 956473 | 8/1949 | France | 29/96 |
| 139242 | 4/1930 | Switzerland | 29/96 |
| 257171 | 9/1948 | Switzerland | 29/96 |
| 304805 | 1/1955 | Switzerland | 29/96 |
| 21355 of | 1898 | United Kingdom | 29/96 |

Primary Examiner—Harrison L. Hinson
Attorney, Agent, or Firm—William L. Fisher

[57] ABSTRACT

An improved carbide bit cutting tool comprising of the type a tool body having a tool-bit-receiving aperture formed therein inwardly of the front end thereof, a carbide tool bit slidable in the aperture so as to be adjustably positionable outwardly of the front end of the tool body, said tool bit having a steel body and a carbide tip cemented on the front end thereof, a fastener for adjustably fastening the tool bit in place in the aperture, a chip breaker member disposed on top of the tool bit and slidable in the aperture so as to be adjustably positionable inwardly of the front end of the tool bit, a second fastener for adjustably fastening the chip breaker member in place in the aperture on top of the tool bit, the front end of the tool bit having a predetermined shape for carrying out a cutting operation and the front end of the chip breaker member having a corresponding shape so as to break chips during the cutting operation inwardly of the front end of the tool bit, the cross-section of the tool bit and that of the chip breaker member both filling up that of the aperture to enhance the solidity with which they are held in place in the tool body.

2 Claims, 8 Drawing Figures

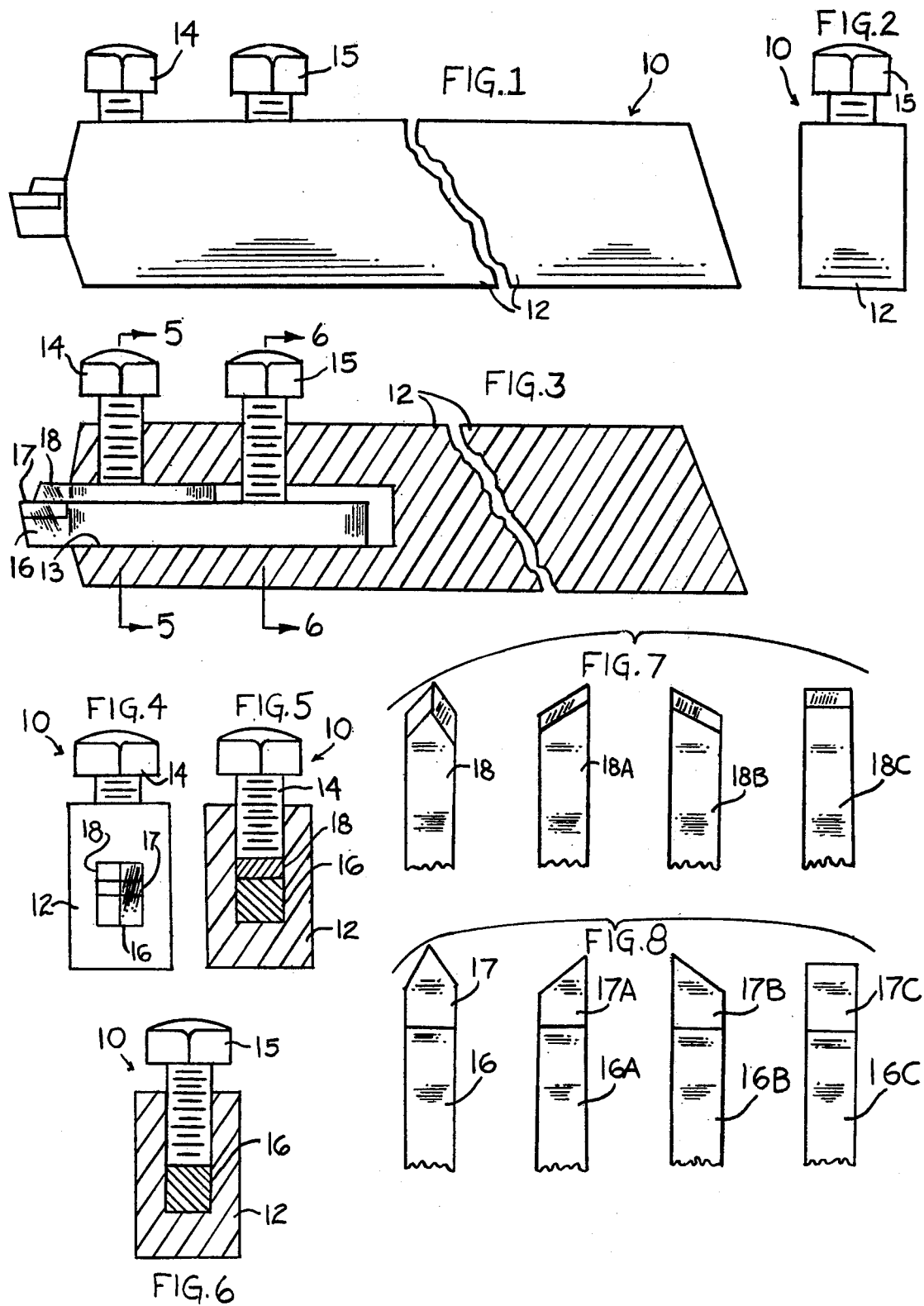

CUTTING TOOL

My invention relates to cutting tools.

The principal object of my invention is to provide an improved cutting tool which is simple in construction but extremely versatile.

The foregoing object of my invention and the advantages thereof will become apparent during the course of the following description, taken in conjunction with the accompanying drawings, in which:

FIGS. 1, 2 and 4 are, respectively, side, rear and front elevational views of an improved carbide cutting tool embodying my invention.

FIG. 3 is a longitudinal sectional view of said embodiment.

FIGS. 5 and 6 are vertical sectional views of the structure of FIG. 3 taken, respectively, on lines 5—5 and 6—6 thereof;

FIG. 7 is a top plan view of various chip breaker members used in my invention; and FIG. 8 is a top plan view of various tool bits corresponding to said chip break members.

Referring to the drawings in greater detail, 10 generally designates said improved cutting tool which comprises a tool body 12 having a tool-bit-receiving aperture 13 formed inwardly of the front end thereof and a pair of threaded apertures threadably carrying adjusting bolts 14 and 15, respectively.

A conventional tool bit is slidable in said aperture 13 and is fastened in place therein with said bolt 15. In the instance, said tool bit consists of a body 16 and a carbide tip 17. The length of said carbide tool bit is less than that of said aperture 13 so that said carbide tip 17 can be adjusted both forwardly and rearwardly in respect to the front end of said tool body 12. I provide a chip breaker number 18 to rest on top of said carbide bit which member 18 is also slidable in said aperture 13 and fastened in place on said carbide bit with said bolt 14.

Said chip breaker member 18 is provided with a tapered front end and breaks chips during a cutting operation. When cutting brass, bronze or cast iron said chip breaker member 18 is moved rearwardly, while for cutting steel it is moved forwardly; the amount it is moved forwardly or rearwardly depends on the particular material being cut.

Since said chip breaker member 18 is held on top of said carbide bit and both completely fill up the cross-section of the aperture 13 they are held solidly in place when the bolts 14 and 15 are properly tightened. Said carbide bit is first positioned and fastened in place in said aperture 13 before said chip breaker member 18 is positioned and fastened on said carbide bit.

I have found that cutting chips formed during a cutting operation by said carbide tip 17 break off and move out of the way of said cutting tool 10 when they meet the tapered face of said chip breaker member 18 provided the latter is properly positioned rearwardly of said carbide tip. The chip breaker member 18 must correspond in so far as its front end is concerned to the shape of the front end of the tool bit as is illustrated for the various chip breaker members shown in FIG. 7 and indicated at 18, 18A through 18C and corresponding carbide bits shown in FIG. 8 and indicated at 16, 17; 16A, 17A through 16C, 17C.

It will thus be seen that there has been provided by my invention an improved cutting tool in which the object hereinabove set forth, together with many thoroughly practical advantages, has successfully been achieved. While a preferred embodiment of my invention has been shown and described, it is to be understood that variations and changes may be resorted to without departing from the spirit of my invention as defined by the appended claims.

What I claim is:

1. An improved carbide bit cutting tool of the type that uses a tool bit having a steel body and a carbide tip cemented on the front end thereof, comprising a tool body having a tool-bit-receiving aperture formed therein inwardly of the front end thereof, a carbide tool bit slidable in said aperture so as to be adjustably positionable outwardly of the front end of said tool body, said tool bit having a steel body and a carbide tip cemented on the front end thereof, fastener means directly engaging said tool bit for adjustably fastening said tool bit in place in said aperture, a chip breaker member disposed on top of said tool bit and slidable in said aperture so as to be adjustably positionable inwardly of the front end of said tool bit, second fastener means directly engaging said chip breaker for adjustably fastening said chip breaker member in place in said aperture on top of said tool bit, the front end of said tool bit having a predetermined shape for carrying out a cutting operation and the front end of said chip breaker member having a corresponding shape so as to break chips during said cutting operation inwardly of the front end of said tool bit, the cross-section of said tool bit and that of said chip breaker member both filling up that of said aperture to enhance the solidity with which they are held in place in said tool body.

2. An improved carbide bit cutting tool of the type as claimed in claim 1 in which said aperture is rectangular in cross-section, said tool bit and said chip breaker member being each rectangular in cross-section, said first-mentioned fastener means being a threaded fastener threadably engaged in said tool body so as to have its shank end bearing upon the top flat surface of said tool bit, and said second fastener means also being a threaded fastener threadably engaged in said tool body so as to have its shank end bearing upon the top flat surface of said chip breaker.

* * * * *

UNITED STATES PATENT OFFICE
CERTIFICATE OF CORRECTION

Patent No. 4,135,845    Dated January 23, 1979

Inventor(s) Andrew Rea

It is certified that error appears in the above-identified patent and that said Letters Patent are hereby corrected as shown below:

On the Title Page, first two lines of the Abstract should read -- An improved carbide bit cutting tool of the type comprising a tool body having a tool-bit-receiving aperture --.

Signed and Sealed this

Seventeenth Day of April 1979

[SEAL]

Attest:

RUTH C. MASON
Attesting Officer

DONALD W. BANNER
Commissioner of Patents and Trademarks